Figure 1:
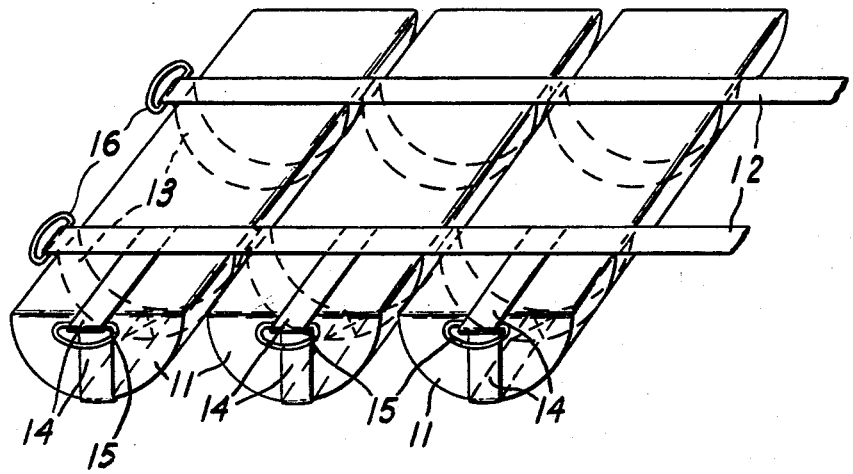

March 2, 1965   E. H. E. MARTIN ETAL   3,171,141
FLOATING PLATFORMS
Filed Oct. 15, 1963

Inventors
Erwin H. E. Martin
Richard N. Thomson
By Stevens, Davis, Miller + Mosher
Attorneys

3,171,141
FLOATING PLATFORMS

Erwin Herbert Erhard Martin, Coventry, and Richard Noel Thomson, Coleshill, England, assignors to Dunlop Rubber Company Limited, County of London, England, a British company
Filed Oct. 15, 1963, Ser. No. 316,332
Claims priority, application Great Britain, Oct. 30, 1962, 40,897/62
4 Claims. (Cl. 9—11)

This invention relates to floating platforms, including pontoons. A specific application of floating platforms in accordance with the invention is that of targets for bombing practice on the sea.

According to the present invention, a floating platform incorporates buoyancy elements comprising bodies of closed-cell cellular synthetic resin composition enclosed in a textile-fabric or wire-mesh envelope, the buoyancy elements being harnessed together.

Preferably the buoyancy elements comprise bodies of a closed-cell cellular polystyrene composition. In this case they may if desired be cut to the requisite dimensions either mechanically or by hot-wire cutting from a ready-made block of cellular polystyrene composition. They may also, however, be produced by taking bodies of a partially-expanded polystyrene composition containing an inflating agent, and subjecting these bodies to a second expansion process in a heated mould of the requisite dimensions. A third method which may be used for producing the cellular polystyrene composition bodies comprises mixing granules of expanded polystyrene composition with a bonding agent, e.g. a liquid polyurethane-forming composition, and causing or allowing bonding to take place in a mould of the requisite dimensions. In this connection reference may be made to our U.K. patent application No. 46,242/61.

Preferably the bodies of the cellular synthetic resin composition are of substantially semicylindrical shape, but with the edges rounded and the end faces undercut to permit undulation. It will be understood that the buoyancy elements of a platform according to the present invention, when the platform is in use, float independently of each other within the limits imposed by their harness and the components or structure which they support. In the modified semicylindrical shape just specified, the bodies of the cellular synthetic resin composition can readily be fitted with the textile-fabric envelopes specified earlier, and these envelopes may suitably be of nylon fabric of relatively open weave. However, envelopes of hessian or cotton fabrics or wire mesh, for example, may also be used if desired. The individual buoyancy elements each comprising a body of cellular synthetic resin composition enclosed in a textile-fabric envelope may be harnessed together in a simple rank-and-file arrangement or any other desired arrangement by means of straps of webbing stitched and/or cemented together, preferably in such a way that the buoyancy elements are independently replaceable in the event of damage, e.g. by merely removing the damaged buoyancy element from two loops of the harness and inserting a new one in its place; by virtue of the flexibility of a floating platform incorporating harness of the kind contemplated, this replacement can be easily effected by folding the platform along a line adjacent to the ends of one row of buoyancy elements, thus eliminating the need for disturbing any of the stitched or cemented joints. To provide the loops in the harness just mentioned, webbing straps passing beneath the buoyancy elements may be included in the harness in addition to webbing straps passing above these elements.

Any components or structure which the floating platform is to support, e.g. a target sheet, which may suitably take the form of a conspicuously-coloured rubber-proofed sheet, or a system of duckboards, or navigational lights, or radar reflectors, may suitably be attached to the webbing straps, and the ends of some at least of the webbing straps may be provided with metal rings and/or spring-hooks to facilitate the attachment of the floating platform to other structures or to anchors or to additional floating platforms if a multiple-unit floating structure should be required. The ends of the webbing straps may also if desired have edge ropes secured to them with a view to increasing the stability of the assembly and/or facilitating handling.

To provide a specific example of the arrangements which may be adopted in a floating platform in accordance with the present invention, reference may be made to a bombing-target unit measuring 15 feet square and comprising 50 buoyancy elements, each of generally semi-cylindrical form with a length of 3 feet, a breadth of 17 inches, an approximate weight of 4½ lbs., and an approximate buoyancy of 120 lbs., arranged in 10 ranks and 5 files. The individual buoyancy elements comprise bodies of cellular polystyrene composition enclosed in a nylon fabric envelope and harnessed together by means of 4"-wide webbing straps.

Floating platforms can be made in accordance with the present invention which are relatively inexpensive (compared with rigid structures or structures using such buoyancy materials as cork or balsa) but which will still give good service for long periods with little attention.

The invention is illustrated in the accompanying drawings, in which

Figure 2:
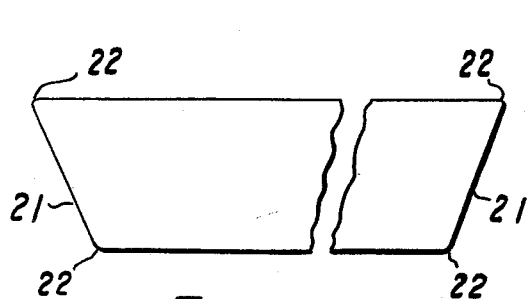
Figure 3:
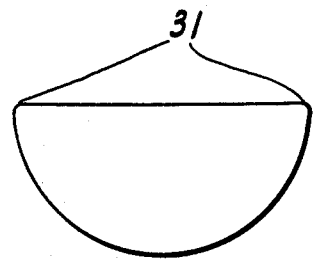

FIGURE 1 is a perspective view showing one corner of a floating platform in accordance with the present invention intended for carrying a target sheet (not shown), FIGURE 2 is a broken side view of one of the buoyancy elements of the platform of FIGURE 1, and FIGURE 3 is an end view of one of these buoyancy elements.

In FIGURE 1, three generally semicylindrical bouyancy elements of expanded polystyrene composition, enclosed in individual textile-fabric envelopes, are shown at 11, each being held in two loops formed between upper longitudinal webbing straps 12 and lower (looped) longitudinal webbing straps whose position is shown in broken lines at 13. Escape of buoyancy elements at the sides of the platform is prevented by end straps 14. The end straps 14 also carry D-shaped steel rings 15, which, with similar rings 16 on the ends of the straps 12, facilitate attachment of the platform to other structures or to another platform. The three bouyancy elements 11 shown in FIGURE 1 may be secured laterally (i.e. in the direction at right angles to that of the straps 12) by various means, including the attachment of the longitudinal straps to the target sheet itself (not shown), and the provision of upper lateral straps (not shown) which connect together the various longitudinal straps of the platform and which may if desired be unitary with the end straps 14.

In FIGURES 2 and 3, the buoyancy element shown, through generally cylindrical, is undercut at its ends as seen at 21 so that the platform as a whole can easily undergo undulation, and has its edges rounded, as shown at 22 and 31.

Having now described our invention, what we claim is:

1. A floating platform comprising a plurality of buoyant bodies, each buoyant body being of a closed cell synthetic resin composition, each buoyant body being enclosed in an envelope, each buoyant body being of generally elongate form, semicylindrical in cross-section and having a flat surface facing upward, the edges thereof being rounded and the ends thereof being undercut, the buoyant bodies being held together by the flexible straps in generally parallel relationship to thereby define a planar row of buoyant bodies with segments of the row being free to undulate about parallel axes by virtue of the flexibility of the said straps.

2. The floating platform of claim 1 in which each buoyant body is formed of polystyrene.

3. The floating platform of claim 1 wherein two spaced loops of the flexible strap material enclose each body at two points intermediate the ends thereof, whereby each body may be individually withdrawn from the platform.

4. The floating platform of claim 1 wherein the said buoyant bodies are spaced apart a distance not greater than the width of the bodies.

References Cited by the Examiner
UNITED STATES PATENTS

| 1,825,613 | 9/31 | Bell | 114—0.5 |
| 1,829,137 | 10/31 | Harris | 9—11 |
| 2,660,194 | 11/53 | Hoffman | 114—0.5 |
| 2,802,222 | 8/57 | Chapman | 9—340 |

FOREIGN PATENTS

| 359,438 | 10/31 | Great Britain. |
| 879 | 1876 | Great Britain. |

FERGUS S. MIDDLETON, *Primary Examiner.*